United States Patent [19]

Bruno

[11] Patent Number: 4,854,808

[45] Date of Patent: Aug. 8, 1989

[54] MULTI-ARTICULATED INDUSTRIAL ROBOT WITH SEVERAL DEGREES OF FREEDOM OF MOVEMENT

[76] Inventor: Bisiach Bruno, Via Mentana 23 bis, 10133, Turin, Italy

[21] Appl. No.: 211,344

[22] Filed: Jun. 24, 1988

[30] Foreign Application Priority Data

Jul. 10, 1987 [IT] Italy .............................. 67593-A/87

[51] Int. Cl.$^4$ ............................................. B25J 18/00
[52] U.S. Cl. ..................................... 414/680; 74/411; 74/417; 74/425; 74/479; 74/665 C; 464/169; 901/15; 901/26; 414/735
[58] Field of Search ................ 414/680, 729, 735; 901/15, 26; 74/411, 417, 425, 479, 665 C, 665 K; 464/169, 162

[56] References Cited

U.S. PATENT DOCUMENTS

| | | | |
|---|---|---|---|
| 3,922,930 | 12/1975 | Fletcher et al. | 901/27 X |
| 4,770,055 | 9/1988 | Chevance et al. | 74/411 |
| 4,771,652 | 9/1988 | Zimmer | 901/26 X |

FOREIGN PATENT DOCUMENTS

| | | | |
|---|---|---|---|
| 1256961 | 9/1986 | U.S.S.R. | 901/26 |
| 879919 | 10/1961 | United Kingdom | 464/162 |
| 917187 | 1/1963 | United Kingdom | 464/162 |

*Primary Examiner*—Robert J. Spar
*Assistant Examiner*—Donald W. Underwood
*Attorney, Agent, or Firm*—Paul & Paul

[57] ABSTRACT

An industrial robot comprising a column housing a first group of coaxial hollow shafts rotatably coupled to a first articulated joint positioned at about 60° to the first group of hollow shafts. A second group of coaxial hollow shafts receives the rotating movement from the first articulated joint and transmits it to a second articulated joint, also arranged in slanted relationship at 60°. A third group of coaxial hollow shafts receives the rotating movement from the second articulated joint and transmits it to a third articulated joint which in turn is connected to an end bush supporting implements or operative tools.

The invention is of particular advantage thanks to its high mobility and to the particular orientation in the space allowed to the several articulated joints.

20 Claims, 3 Drawing Sheets

MULTI-ARTICULATED INDUSTRIAL ROBOT WITH SEVERAL DEGREES OF FREEDOM OF MOVEMENT

BACKGROUND OF THE INVENTION

The present invention relates to a multi-articulated industrial robot with several degrees of freedom of movement, and more precisely to a new combined control system for the rotating and raising movements of the robot operating arms.

Industrial robots are usually defined as machines adapted to carry out manipulating and handling operations on workpieces according to a precise control cycle using, in order to carry out such operations, an operating head which can be oriented in accordance with desired positions within a predetermined working area.

Usually the robot is equipped with arms having several degrees of freedom of movement and is therefore able to orient itself to any position within a predetermined space.

Generally, the tools carrying head is placed at one end of a movable arm, and can move in the space along two or three coordinates, as mentioned before, and moreover assume several angular postures.

It is clear from the above that industrial robots are able to move along more than one independent axis, correspondently driven by as many actuators.

Generally, in order to carry out such linear displacements it is resorted to hydraulic, pneumatic or electromechanical jacks or other equivalent means.

As a rule, robots are built up by a base structure on which a column is mounted, generally rotatable about its axis and supporting an arm at its top, this latter being hinged around a horizntal rotation axis in order to achieve a swing of the arm upward or downward.

Such movements, while in most cases are wide enough and such as to allow the robot to reach the several positions required to carry out the scheduled operations, can sometimes prove to be limited in particular operations, and this can be overcome through the use of additional robots or through subsequent working operations.

Although the addition of particular devices or equipments to the basic structure of the robot leads to a better functionality, nevertheless it can limit the robot operative features by slowing down the operating speed or by limiting the movements or the working accuracy.

SUMMARY AND OBJECTS OF THE INVENTION

An object of the present invention is to overcome the above shortcomings, by providing a multi-articulated industrial robot with several degrees of freedom of movement, which is adapted to reach, through a tool carried by an operating head, any desired point in the space within the range of its sizes.

An additional object of the present invention is to provide an axial cavity along the entire robot in order to house therein electrical cables for current supply, or pipes for supplying process fluids, or to allow the passage of a power laser beam.

The above and other objects of the invention which will become evident from the following description, are attained thanks to a multi-articulated industrial robot with several degrees of freedom of movement, characterized in that it comprises:

a first group of n coaxial hollow shafts rotatably supported in respect of each other about their axis in a column, connected at one end to a group of n helical gears coupled to motor driven means for transmitting the motion, the outermost one of said hollow shafts being connected at the opposite end to a first rotation support with slanted axis, each of the remaining $n-1$ inner shafts carrying a bevel gear;

a first articulated joint comprising a first group of $n-1$ coaxial bushes, rotatably mounted in respect of each other about an axis which is slanted in respect of the axis of said first group of n hollow shafts in said first rotation support, and coupled at one end with bevel gears to said $n-1$ inner hollow shafts of said first group of hollow shafts, and provided at the opposite end, but for the outermost bush, with $n-2$ bevel gears, the outermost bush carrying instead a second rotation support;

a second group of $n-2$ coaxial hollow shafts rotatably supported in respect of each other about their axis in a third rotation support which is secured to said second rotation support, coupled at one ends to said $n-2$ bevel gears of said first group of bushes, and at the opposite end the outermost one of said hollow shafts being connected to a fourth rotation support with slanted axis, and each of the $n-3$ inner hollow shafts carrying a bevel gear;

a second articulated joint comprising a second group of $n-3$ coaxial bushes, rotatably mounted in respect of each other about an axis which is slanted in respect of the axis of said second group of $n-2$ hollow shafts in said fourth rotation support, and coupled at one end through bevel gears to said $n-3$ inner hollow shafts of said second group of hollow shafts and provided at the opposite end, but for the outermost bush, with $n-4$ bevel gears, the outermost bush carrying instead a fifth rotation support;

a third group of $n-4$ coaxial hollow shafts, rotatably mounted in respect of each other about their axis in a sixth rotation support fastened to said fifth rotation support, and coupled at one end to said $n-4$ bevel gears of said second group of bushes, and the outermost one of said shafts being connected at the opposite end to a seventh rotation support with slanted axis, and each of the $n-5$ inner hollow shafts carrying a bevel gear;

a third articulated joint comprising a third group of $n-5$ coaxial bushes, rotatably mounted in respect of each other about an axis slanted in respect of the axis of said third group of $n-4$ hollow shafts in said seventh rotation support, and coupled at one end through bevel gears to said $n-5$ inner hollow shafts of said third group of hollow shafts, the outermost bush carrying at the opposite end an eighth rotation support, and the $n-6$ inner bushes carrying $n-6$ bevel gears coupled to $n-6$ end bushes rotating about an axis which is offset but parallel to the axis of said third group of hollow shafts and provided with respective bevel gears for supporting and/or actuating the robot tools.

The invention will now be described with reference to the attached drawings, only supplied as exemplary and non limiting drawings, in which:

DESCRIPTION OF PREFERRED EMBODIMENT

Figure 1:
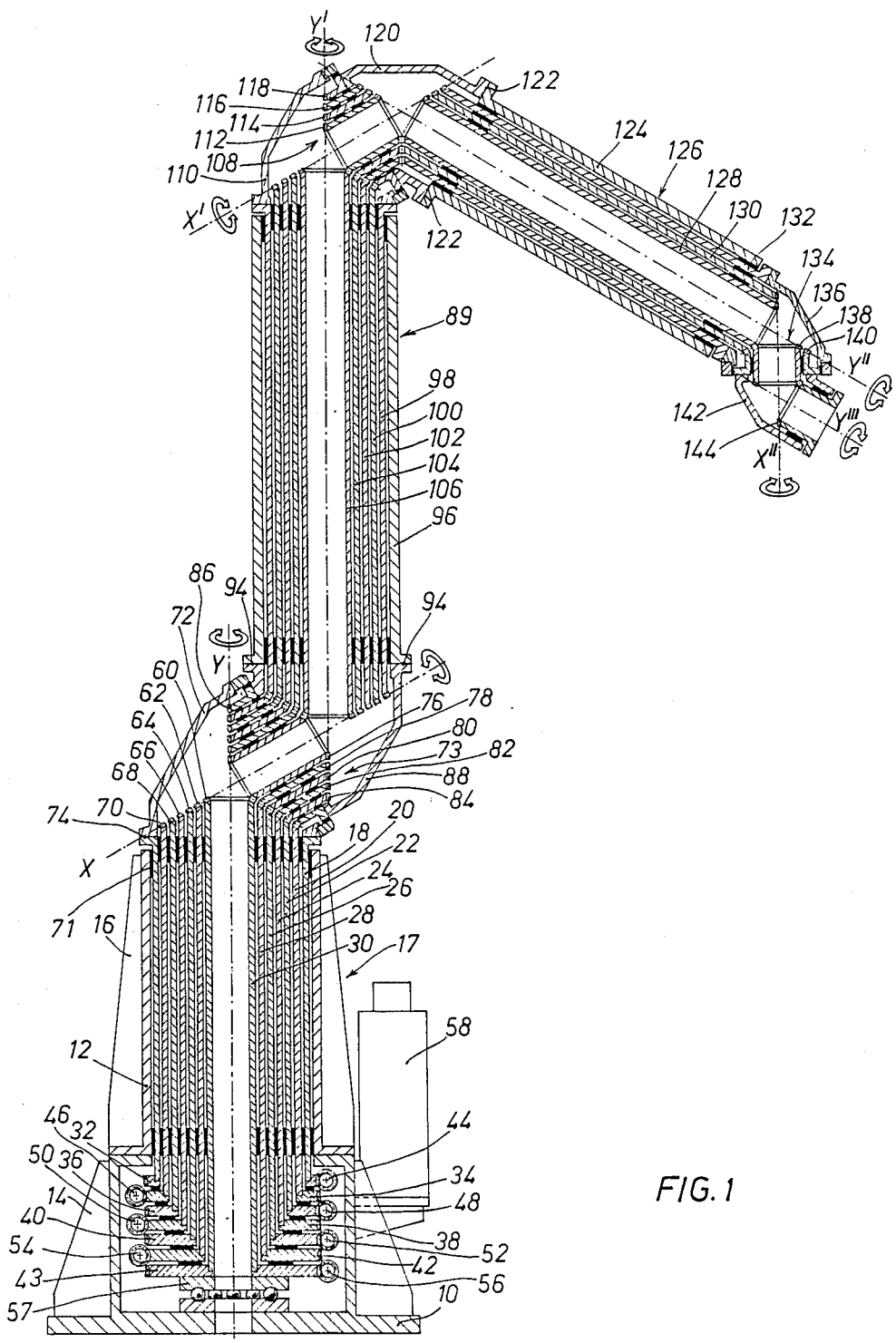
FIG. 1 is an overall schematic view along an axial cross section of an industrial robot with a plurality of articulated joints according to the invention.

With reference to the figures there has been generally and schematically illustrated an industrial robot comprising a hollow base 10, a supporting hollow column 12 secured to said base 10, and a plurality of stiffening ribs 14,16 connected to the base 10 and to the column 12 respectively.

Within the inner room formed by the union of the support 10 with the column 12, there is housed a first group of hollow shafts 18,20,22,24,26,28,30 on the whole referred to with number 17, coaxially and rotatably mounted to each other,—along an axis marked with letter y—each carrying at one end helical gears 32,34,36,38,40,42,43 engaging as many worm screws 44,46,48,50,52,54,56 connected to and driven into rotation by reference motor means such as 58.

Between the base 10 and the helical gear 43 it is interposed an axial bearing 57 which facilitates the rotation of the group of hollow shafts 17, and at the same time bears the axial forces generated in the rotating placements of the different groups of shafts forming the industrial robot.

The above mentioned motors are substantially made up by direct or alternate current electrical motors equipped with position detecting devices, one for each worm screw, adapted to rotate by desired angular steps in response to electric pulses of predetermined values and obtained from process control devices, usually in form of numeric control devices, not shown in the figures.

The opposite end of each hollow shafts 20,22,24,26,28,30 carry a bevel gear 60,62,64,66,68,70, respectively coupled with further bevel gears carried in turn by rotatable bushes which will be described later.

Figure 2:
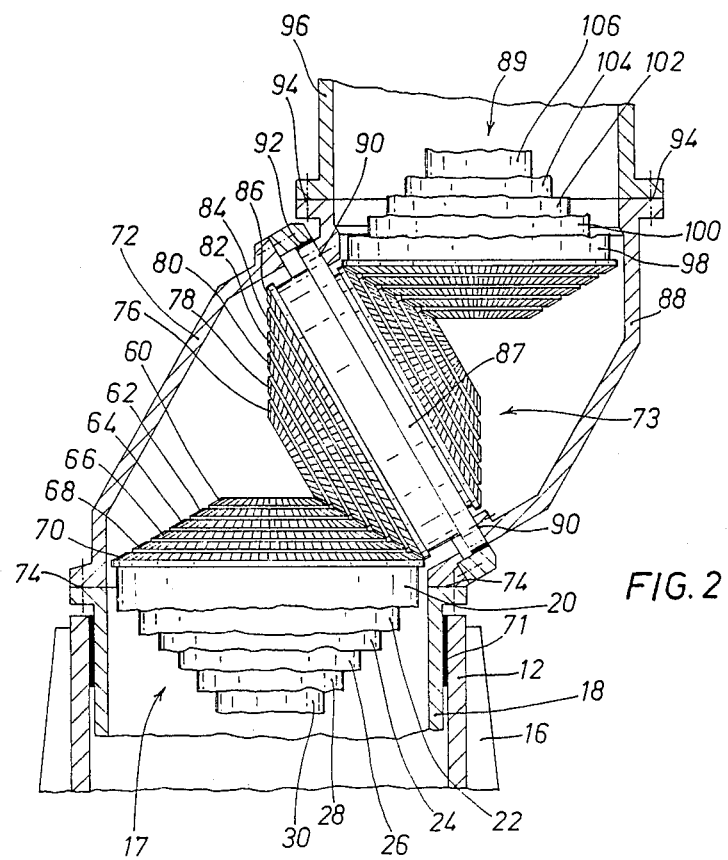
FIG. 2 is an enlarged and partially cross section view of the first articulated joint of the industrial robot according to the invention.

On hollow shaft 18 it is mounted a sliding bearing 71 of self-lubricating plastic material to make easier the rotation, as shown in FIGS. 1 and 2.

Said self-lubricating plastic bearing 71, although only schematically represented, is to be understood as being mounted on all the shafts, bushes or other rotating members making up the robot.

Further, the above sliding bearings can be replaced all the same by ball or roller bearings.

Additionally, said sliding bearings 71 accomplish a sealing function in respect of possible lubricants disposed between one hollow shaft and another, they are usually made up by a number of thin layers of synthetic material forming a ring fitted on and adhering to rotating surfaces.

The opposite end of the hollow shaft 18 does not carry any bevel gear, but rather it is bound through suitable and not shown means to a first rotation support 72.

Therefore the hollow shaft 18 constitutes a means for the transmission of the rotating movement to the rotatable support 72, this latter being firmly secured to said shaft 18 at the junction points 74.

In the first rotation support 72 it is disposed a first articulated joint generally referred with number 73, comprising a first group of bushes 76,78,80,82,84,86, rotatably assembled to each other along the axis of rotation "x", tilted by about 60° with respect to Y axis and supported by the support 72 for their rotation.

The respective ends of bushes 76,78,80,82,84,86 exhibit a bevel gear coupled, during rotaton, at one end to the first group of hollow shafts 17, and at the other end to a second group of hollow shafts indicated on the whole with 89. The outermost bush 86, on the contrary, at one end meshes with a hollow shaft 20, and at the other end is fitted into a collar 87 which in turn is firmly secured during the rotation to a second rotation support 88 at junction points 90.

A sliding bearing 92, of the kind already described, is fitted to collar 87 to make easier the rotation between said first support 72 and the collar 87.

At the junction points 94, the second rotation support 88 is secured to a third rotation support 96 within which rotates the second group of hollow shafts 89 forming together a first movable arm, the shafts being driven into rotation by the first group of bushes 73 as already described.

Said second group of hollow shafts 89 is made up by shafts 98,100,102,104,106 rotatable about axis y' and carrying at the respective ends a bevel gear coupled on the one hand to the first group of bushes 73, and on the other to the second group of bushes 108, but for the outermost hollow shaft 98 which on the side of the second group of bushes 108 carries no bevel gears, but instead is firmly secured to a fourth rotatable support 110 which rotates about a slanted axis x' positioned at about 60°.

The above mentioned second group of bushes 108, rotatable about axis x', is made up by bushes 112,114,116,118 each carrying a bevel gear at one end but for bush 118 which instead of a bevel gear carries a fifth rotation support 120, rotatable secured at junction points 122 to a sixth rotation support 124 within which rotate a third group of hollow shafts, marked with arrow numbered 126—on the whole building up a second movable arm—driven into rotation by the above articulated joint 108.

Said third group of hollow shafts 126 is made up by shafts 128, 130,132 which are rotatably mounted one within the other and are rotatable about an axis y".

Each shaft of the above group 126 carries at its end a bevel gear coupled on the one hand to the second group of bushes 108, and on the other to a third group of bushes 134 marked by an arrow in FIG. 1, but for the outermost hollow shaft 132 which on the side of the third group of bushes carries no bevel gears, but instead is secured to a seventh rotatable support 136 to which it transmits a rotating movement about an axis slanted at about 60° and marked with letter x".

A third group of bushes 134, rotatable about the axis x", is made up by bushes 138,140 each carrying a bevel gear at its end but for the outermost bush 140 which instead of a bevel gear carries an eighth rotation support 142 rotatable about the axis y''' within which a bush 144 is positioned rearwardly meshing with bush 138 of said third group of bushes 135 and forwardly carrying an end flange for fastening tools or operating heads.

Assuming that the above disclosed robot structure has three articulations, there are seven degrees of freedom of movement about axes y-x, y'-x', y"-x"-y''', obtained as follows:

the first degree of freedom of movement—i.e. the rotation about axis y—is defined by the rotation of the hollow shaft 18 disposed within the column 12. The hollow shaft 18 is connected to a helical gear 32 coupled to a worm screw 44, this latter being rotated by a D.C. or A.C. electric motor connected thereto.

The hollow shaft 18 connected to the rotation support 72 transmits a rotation movement to the second group of hollow shafts 89,—or first movable arm—causing it to rotate about the above mentioned axis y in accordance with angular displacements determined by the rotation of worm screw 44.

The second degree of freedom of movement—i.e. the rotation about axis x—is defined by the rotation of the hollow shaft 20 disposed within the column 12, which is connected to a helical gear 34 coupled in turn to a worm screw 46 which is rotated by a D.C. or A.C. electric motor connected thereto.

The rotation of the hollow shaft 20 causes the bush 86 to rotate and therefore the rotation of the support 88 and of the whole group of hollow shafts 89—or first movable arm—about the axis x in accordance with angular displacements determined by the rotation of screw worm 46.

The combined movements of the hollow shaft 18 secured to support 72 about axis y, and of the hollow shafts 20 secured to support 86 by means of the bush 86 about axis x, realizes a double movement of rotation and swing which allows the first movable arm 89 to assume any orientation within a space defined by the size of the arm.

The third degree of freedom of movement—i.e. rotation about axis y'—is defined by the rotation of the hollow shaft 22, positioned within the column 12, which is connected to a helical gear 36 coupled in turn to a worm screw 48 rotated by a D.C. or A.C. electric motor connected thereto. The rotation of hollow shaft 22 is transmitted to the bevel gear bush 84 and to the hollow shaft 98 to which a fourth rotation support 110 is rotatably joined. The rotation of this latter is transmitted to the third group of hollow shafts 126—or second movable arm—causing it to rotate about the above mentioned axis y'—in accordance with the angular displacements determined by worm screw 48.

The fourth degree of freedom of movement—i.e. rotation about axis x'—is defined by the rotation of the hollow shaft 24 positioned within column 12, which is connected to a helical gear 38 coupled to a worm gear 50 rotated by a D.C. or A.C. electric motor connected thereto. The rotation of shaft 24 is transmitted to the gear bush 82 and therefore to the hollow shaft 100 which in turn causes a bush 118 to rotate together with a support 120 secured thereto, thus causing the third group of hollow shafts 126 -or second movable arm—to rotate about axis x' in accordance with angular displacements determined by the rotation of worm screw 50.

The combined movements of the hollow shaft 98 secured to support 110 about axis y', and of the hollow shaft 100 secured through the bush 118 to support 120 about axis x, produces a double movement of rotation and swing thus allowing the second movable arm 126 to assume any orientation within a space defined by the size of the arm.

The fifth degree of freedom of movement, i.e. the rotation about axis y"—is defined by the rotation of hollow shaft 26 positioned within column 12 and connected to a helical gear 40 coupled in turn to worm screw 52 rotated by a D.C. or A.C. electric motor connected thereto. Rotation of the hollow shaft 26 causes the rotation of the bush 80, the hollow shaft 102, the bush 116, the hollow shaft 132 and of the seventh rotation support 136—by rotating this latter about the above mentioned axis y"'—in accordance with angular displacements determined by the worm screw 52.

The sixth degree of freedom of movement—i.e. rotation about axis x"—is defined by the rotation of the hollow shaft 28 positioned within the column 12 and connected to a helical gear 42 coupled to a worm screw 54 which is rotated by a D.C. or A.C. electric motor connected thereto. The rotation of the hollow shaft 26 is transmitted to the bush 78, returned to the hollow shaft 104, then to the bush 114 which in turns applies it to the hollow shaft 130 and to the eighth rotatable support 142—causing it to rotate about the axis x"—in accordance with angular displacements determined by the worm screw 54.

The seventh degree of freedom of movement—i.e. rotation about axis y'''—is defined by the rotation of the hollow shaft 30 positioned within the column 12 and connected to a helical gear 44 coupled to a worn gear 54 which is rotated by a D.C. or A.C. electric motor connected thereto.

The rotation of the hollow shaft 26 is transmitted to the bush 76, returned to the hollow shaft 106, then to the bush 112 and to the hollow shaft 128 which in turn applies it to the bush 138 and to the end bush 144—causing it to rotate about the above mentioned axis y'''—in accordance with angular displacements determined by the worm screw 56.

The combined movement of the hollow shaft 132 secured to support 136 about axis y''', of the hollow shaft 130 secured through the bush 140 to support 142 about axis x", and of the hollow shaft 128 meshing with the bush 138 and the end bush 144 about axis y''', produces a triple movement of rotation, swing and rotation respectively, such as to allow the orientation and positioning according to a desired position for an implement or tool secured to the end bush 144.

It is clear that the combined kinematic movements about the respective axes of the first movable arm 89, of the second movable arm 126 and of the terminal movable group, allow to a tool or positioning and manipulation implements mounted on the above mentioned terminal movable group, to position themselves according to desired space orientations which are not possible with the known robots.

Further, an additional advantage of the robot according to the invention is that the terminal movable group is without of electric actuators or other devices adapted to control or adjust said actuators, such as microswitch, cams, and so on, as disclosed in Italian Patent issued on May 21st 1985 under N. 1.083.111 to the same applicant and entitled "A tools carrying head for a machine tool", thus obtaining a considerable reduction in weight of the above mentioned group together with the possibility of connection to tools or implements even of considerable complexity.

Figure 4:
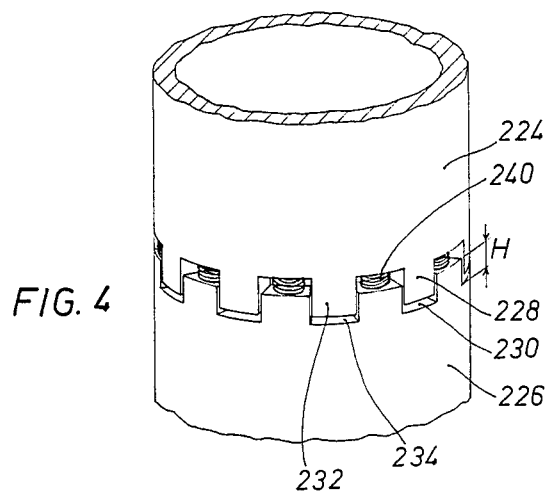
FIG. 4 is an enlarged perspective view of a detail of the embodiment shown in FIG. 3.
Figure 3:
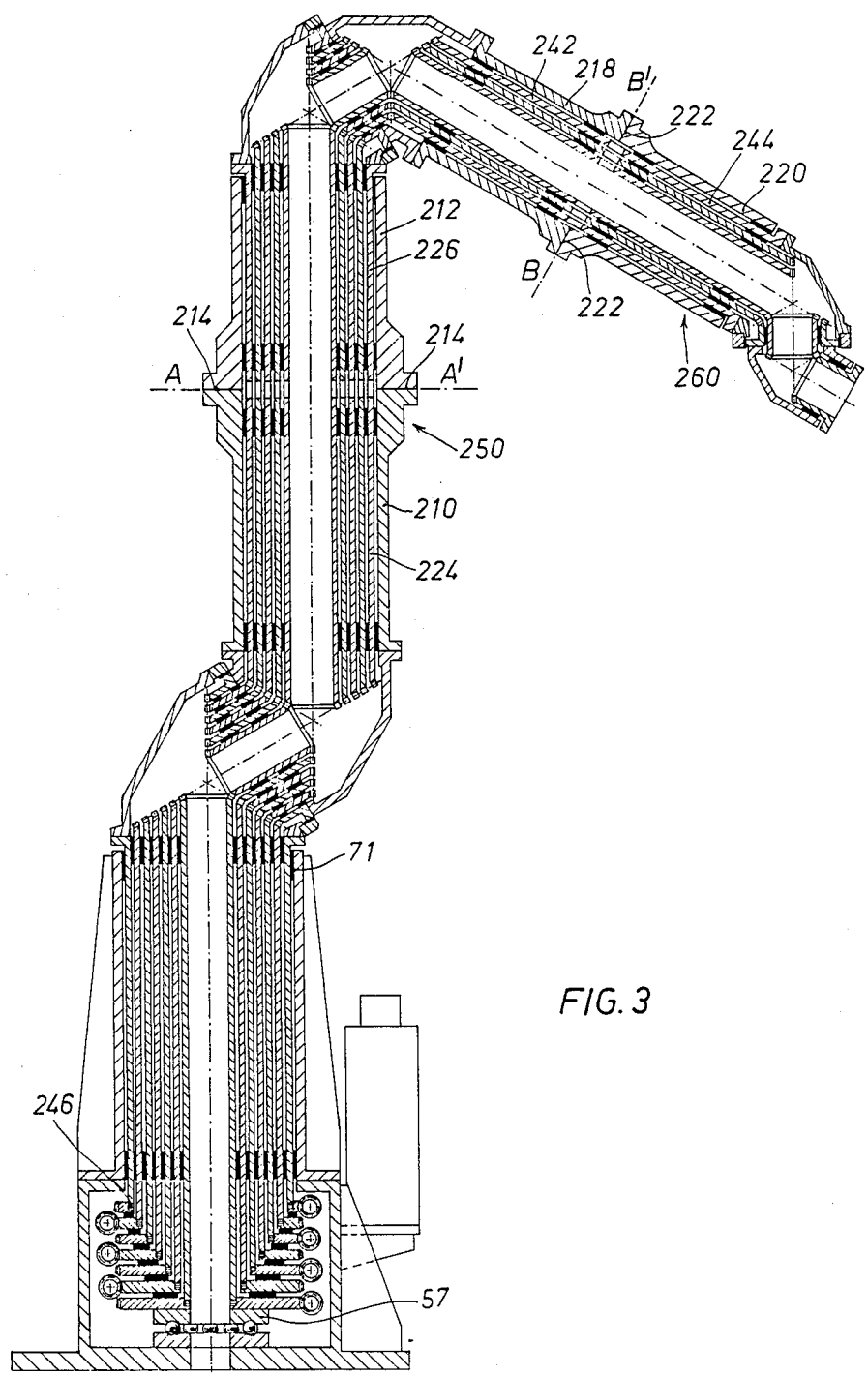
FIG. 3 is an overall schematic cross section view of a different embodiment of the multi-articulated industrial robot according to the invention.

In FIGS. 3 and 4 it is shown a modified embodiment in respect of the one illustated in FIGS. 1 and 2.

In order to make easier the assembling operations of the industrial robot according to the invention, the third rotation support shown in FIG. 1 with reference 96, instead of being integrally formed, is built up by two separate support members 210,212 (shown in FIG. 3) rotatably joined together at junction points 214.

What has been illustrated for the above disclosed new solution with reference to the third support 96, also fully applies to to the sixth rotation support 124 so as to realize two separate support members 218,220 rotatably joined at the junction points 222.

Moreover, in order to obtain an effective and strong action in recovering the plays between the toothed couplings of the hollow shafts 98,100,102,104,106 meshing with the bush groups 73 and 108, the above mentioned shafts too are transversely split into two parts along an intermediate line AA', thus obtaining two separate hollow half shafts from each previous hollow shaft, as illustrated in Fig.s 3 and 4.

In Fig.4 there has been shown, for simplicity of illustration, the coupling of two half shafts only, marked by references 224,226, but it is to be understood that what has been described for such two half shafts also applies to all the remaining hollow shafts coaxially positioned in respect of each other and forming the second group 89 and the third group 126 of hollow shafts.

The half shafts 224,226 are precisely coupled together through a plurality of tabs 228 engaging corresponding recesses 230 formed on the intermediate section AA'.

In order to recover possible plays and obtain a constant fitting between each half shaft and the engaged bushes, resilient member 240 have been provided such as Belleville washers, compression springs, etc., between each head 232 of the tabs 228 and the correspondig bases 234 of the recesses 230.

Said resilient members 240 simultaneously impart a longitudinal shift to both the half shafts 224,226 and cause a constant adherence between the teeth of the respectively coupled members, thus recovering the play between said coupled members.

To prevent any possible sliding of the hollow half shafts 224 and 226 out of the coupling position, the maximum longitudinal shift allowed to said half shafts is of course shorter than the height "H" of the recess 230.

Of course what has been described in respect of the coupling of the second group of hollow half shafts 250 is equally valid for the third group of hollow half shafts 260, both shown in FIG. 3.

Therefore said third group of hollow half shafts 260 is obtained by dividing along the intermediate section line BB' the hollow shafts 128,130,132 belonging to the previous group of shaft 126 shown in FIG. 1.

As an example, from the previous hollow shaft 132, according to this embodiment two hollow half shafts are obtained shown in FIG. 3 marked with references 242 and 244.

Further, to recover the plays arising during the rotation between the first group of hollow shafts 17 and the group of bushes 73 coupled together, resilient members 246 equivalent to those already described, have been placed in the lower part of each hollow shaft 18,20,22,24,26,28,30, such resilient members acting between said shafts and the respective helical gears 32,34,36,38,40,42,43 in engagement with the former, and adapted for the transmission of the movements.

Said resilient members 246, by imparting a longitudinal shift to the hollow shafts, cause a constant joint, without plays, between the respective coupled and rotatable members.

Moreover, by adding additional hollow shafts and the corresponding transmission bushes, the operative capacities of the robot would increase, allowing to provide in the terminal movable group additional rotatable bushes suitable for mouting several implements or manipulating devices, whereas on the contrary a reduction of said hollow shafts and of the corresponding bushes would limit the manufacturing costs and would make more economic on the whole the industrial robot disclosed in the present invention.

I claim:

1. A multi-articulated industrial robot with several degrees of freedom of movement, comprising:
    a first group of n coaxial hollow shafts rotatably supported in respect of each other about their axis in a column, connected at one end to a group of n helical gears coupled to motor driven means for transmitting motion, the outermost one of said hollow shafts being connected at the opposite end to a first rotation support with slanted axis, each of the remaining n-1 inner shafts carrying a bevel gear;
    a first articulated joint comprising a first group of n−1 coaxial bushes, rotatably mounted in respect of each other about an axis which is slanted in respect of the axis of said first group of n hollow shafts in said first rotation support, and coupled at one end with bevel gears to said n−1 inner hollow shafts of said first group of hollow shafts, and provided at the opposite end, but for the outermost bush, with n−2 bevel gears, the outermost bush carrying instead a second rotation support;
    a second group of n−2 coaxial hollow shafts rotatably supported in respect of each other about their axis in a third rotation support which is secured to said second rotation support, coupled at one ends to said n−2 bevel gears of said first group of bushes, and at the opposite end the outermost one of said hollow shafts being connected to a fourth rotation support with slanted axis, and each of the n−3 inner hollow shafts carrying a bevel gear;
    a second articulated joint comprising a second group of n−3 coaxial bushes, rotatably mounted in respect of each other about an axis which is slanted in respect of the axis of said second group of n−2 hollow shafts in said fourth rotation support, and coupled at one end through bevel gears to said n−3 inner hollow shafts of said second group of hollow shafts, and provided at the opposite end, but for the outermost bush, with n−4 bevel gears, the outermost bush carrying instead a fifth rotation support;
    a third group of n−4 coaxial hollow shafts, rotatably mounted in respect of each other about their axis in a sixth rotation support fastened to said fifth rotation support, and coupled at one end to said n−4 bevel gears of said second group of bushes, and the outermost one of said shafts being connected at the opposite end to a seventh rotation support with slanted axis, and each of the n−5 inner hollow shafts carrying a bevel gear;
    a third articulated joint comprising a third group of n−5 coaxial bushes, rotatably mounted in respect of each other about an axis slanted in respect of the axis of said third group of n−4 hollow shafts in said seventh rotation support, and coupled at one end through bevel gears to said n−5 inner hollow shafts of said third group of hollow shafts, the outermost bush carrying at the opposite end an eighth rotation support, and the n−6 inner bushes carrying n−6 bevel gears coupled to n−6 end bushes rotating about an axis which is offset but parallel to the axis of said third group of hollow shafts and provided with respective bevel gears for supporting and/or actuating the robot tools.

2. An industrical robot as claimed in claim 1, including motor means for said motor driven means, said motor means comprising electric motors completed with a position detecting system, in a number corresponding to that of the hollow shafts forming said first group of hollow shafts.

3. An industrial robot as claimed in claim 1, wherein said motor driven means for transmitting motion comprises worm gears.

4. An industrial robot as claimed in claim 1, wherein the inclination of the axis of said first articulated joint in respect of said first group of n hollow shafts is about 60°.

5. An industrial robot as claimed in claim 1, wherein the inclination of the axis of said second articulated joint in respect of said second group of n−2 hollow shafts is about 60°.

6. An industrial robot as claimed in claim 1, wherein the inclination of said third articulated joint in respect of said third group of n−4 hollow shafts is about 60°.

7. An industrial robot as claimed in claim 1, wherein the inclination of the axis of said first articulated joint in respect of said first group of n hollow shafts is about 45°.

8. An industrial robot as claimed in claim 1, wherein the inclination of the axis of said second articulated joint in respect of said second group of n−2 hollow shafts is about 45°.

9. An industrial robot as claimed in claim 1, wherein the inclination of the axis of said third articulated joint in respect of said third group of n−4 hollow shafts is about 45°.

10. An industrial robot as claimed in claim 1, wherein the angle formed by the axis of rotation of said first group of n hollow shafts intersecating the axis of rotation of said first articulated joint is 90°.

11. An industrial robot as claimed in claim 1, wherein the angle formed by the axis of rotation of said second group of n−2 hollow shafts intersecating the axis of rotation of said second articulated joint is 90°.

12. An industrial robot as claimed in claim 1, wherein the angle formed by the axis of rotation of said third group of n−4 hollow shafts intersecating the axis of rotation of said third articulated joint is 90°.

13. An industrial robot as claimed in claim 1, wherein said third rotation support is divided into two parts forming two separate support members coupled together at the junction points.

14. An industrial robot as claimed in claim 1, wherein said sixth rotation support is divided into two parts forming two separate support members coupled together at the junction points.

15. An industrial robot as claimed in claim 1, wherein each of said hollow shafts of said second group of hollow shafts is transversely divided into two half shafts longitudinally sliding in respect of each other and fastened together during rotation.

16. An industrial robot as claimed in claim 1, wherein each of said hollow shafts of said third group of hollow shafts is transversely divided into two half shafts longitudinally sliding in respect of each other and fastened together during rotation.

17. An industrial robot as claimed in claim 15, wherein said separate hollow half shafts are fastened together during rotation through a plurality of tabs engaging with as many recesses.

18. An industrial robot as claimed in claims 15 to 17, wherein a resilient member is placed between each head of said tabs and each base of said recesses.

19. An industrial robot as claimed in claim 1, wherein a resilient member is placed between each hollow shaft and the corresponding helical gear.

20. An industrial robot as claimed in claim 1, wherein an axial cavity which extends along the whole length of the industrial robot is defined within said groups of hollow shafts and said articulated joints.

* * * * *

UNITED STATES PATENT AND TRADEMARK OFFICE
CERTIFICATE OF CORRECTION

PATENT NO. : 4,854,808
DATED : August 8, 1989
INVENTOR(S) : Bruno Bisiach

It is certified that error appears in the above-identified patent and that said Letters Patent is hereby corrected as shown below:

Title page:

[76] Inventor: "Bisiach Bruno" should be changed to
-- Bruno Bisiach --.

Signed and Sealed this

Second Day of October, 1990

Attest:

HARRY F. MANBECK, JR.

*Attesting Officer*     *Commissioner of Patents and Trademarks*